May 9, 1933.    W. M. BAILEY    1,907,474

IMPROVED SHORT WAVE CONDENSER

Filed March 1, 1929

Inventor
WILLIAM M. BAILEY.
By his Attorney

Patented May 9, 1933

1,907,474

UNITED STATES PATENT OFFICE

WILLIAM M. BAILEY, OF LYNN, MASSACHUSETTS, ASSIGNOR, BY MESNE ASSIGNMENTS, TO GENERAL ELECTRIC COMPANY, A CORPORATION OF NEW YORK

IMPROVED SHORT WAVE CONDENSER

Application filed March 1, 1929. Serial No. 343,699.

This invention relates to an improved capacitor assembly, and more particularly to a capacitor assembly adapted for short wave work. As is well known in radio circuits adapted for use with short waves, considerable quantities of energy are generated in the circuit by the very high frequency circuit, more particularly and capacitors, and such generation of heat impairs the efficiency of operation of the apparatus in a circuit, and in the form of heat may result in breakdown of the various parts.

It is an object of the present invention to provide a capacitor assembly which permits the ready removal of heat and is highly efficient in operation and economical to manufacture.

Figure 1:
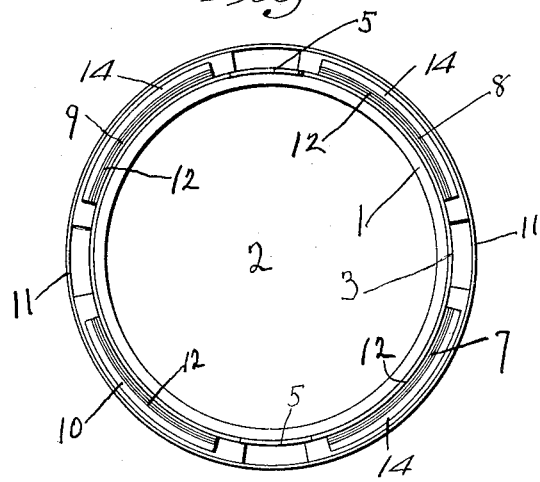
Figure 2:
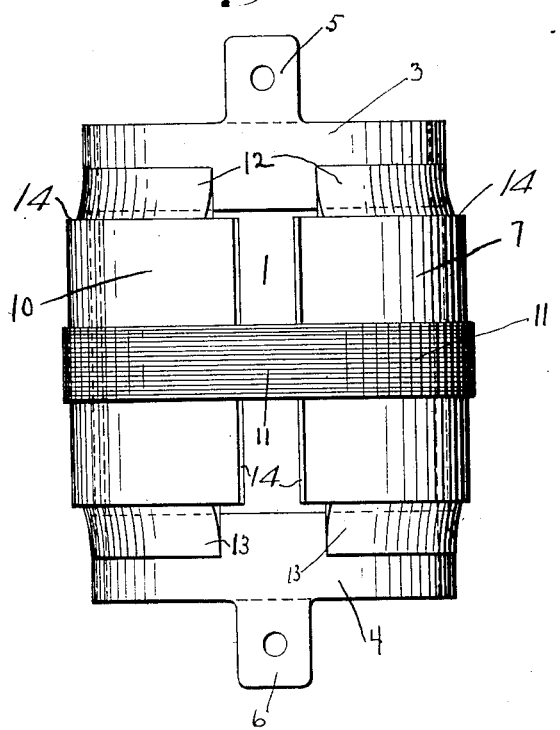

Other desirable objects and advantages will be apparent from the following description and the drawing, in which Fig. 1 is a cross-section of a capacitor in which by the present invention is embodied; and Fig. 2 is an elevation thereof.

The exemplary device comprises a central supporting member 1, which is of insulating material such as micanite or the like, comparatively thin as shown in Fig. 1. This member is preferably tubular in shape and defines an inner space 2 which is in free communication with the outer atmosphere or a cooling medium. The slight thickness of the wall of insulating support 1 provides for small volume of insulating material causing heat generation by being located in the high frequency fields of capacitors for short-wave service. The hollow construction of support 1 and the exposure of the inner surface to the atmosphere provides for dissipation by connection of even the slight amount of heat generated in the insulating material itself.

The capacitor supporting member 1 is provided at each end with two metallic collars 3 and 4 which are secured to the exterior thereof in good mechanical relation in any suitable manner, not shown. These members are severally provided with one or more terminal lugs 5, 6, which may be formed integral with the collars or formed separately and soldered or riveted thereto. As will be explained more in detail, these members 5, 6, in conjunction with the collars, 3, 4 serve as the terminals for the capacitor assembly now to be described.

Periferally disposed on and around the exterior surface of the supporting member 1 are a plurality of flexible sub-units capacitors 7, 8, 9, 10, secured thereto in good mechanical relation and under sufficient pressure to secure them to support 1 and maintain them at their optimum capacity as by suitable securing means such as the cloth tape 11 such as varnished cambric, string or other material wrapped tightly around the capacitor units 7—10 in such a manner as to attach them to support 1 and retain them firmly in optimum operative condition in their mountings on the tubular insulating support. A coating of collodion or other suitable moisture resistant material may be applied to the member 11 after it is applied.

The stacks or capacitors 7, 8, 9, 10 may be formed of alternating layers of mica and foils, the foils 12, 13 of opposite polarity projecting from either end and being soldered or otherwise attached to the respective conducting members 3 and 4, as indicated generally at 12 and 13 in Fig. 2. Fig. 1 shows the end edges 12 of the foils before soldering. In place of mica dielectrics, fish-paper or any other suitable dielectric paper may be used, so that the units may be bent into engagement with the cylindrical wall of tube 1. As shown in Fig. 1 at 14, the outer micas are substantially thicker than those between armature foils. If desired, the entire structure may be dipped in or coated with an insulating varnish in order to preclude the entrance of moisture into and between the mica and foils, or into the paper if used, the mica being far preferable on account of its various superior properties as capacitor dielectric.

It will be readily appreciated that by virtue of the present construction there is provided an improved capacitor assembly particularly adapted for short wave work, in which a plurality of capacitor units may be arranged in parallel within a relatively small compass, while permitting a maximum of efficiency due especially to low losses and also to the rapid and positive removal of heat and the non-existence of structures which could tend to permit the development of what is known as the short circuiting effect.

Referring now particularly to Fig. 1, it will be noted that the electrostatic fields set up about the capacitor units as centers, will be dissipated in the air within and without the tubular support 1 and between the units in the lateral arrangement thereof, the internal diameter of the tubular support 1 being such that the electrostatic fields normally resultant from the operation of the device will not be coupled together in any manner so as to create resulting undesired disturbances, and the units being spaced laterally apart so that the overlapping portions of the fields are of relatively low intensity and therefore innocuous, reducing losses and increasing efficiency.

A further feature of great importance is the ability of the device for permitting the rapid and complete removal of heat, thereby minimizing any tendency towards destruction of the capacitor proper (mica and foils) as the result of the well known deleterious effects of internally generated heat not removed as generated.

As has been pointed out hereinbefore, perforated members 3 and 4 are of any suitable metallic substance, such, for example, as copper, such material having a high degree of heat conductivity and in the particular structures herein shown, due to the extensive area exposed to the air, permit to a high degree the rapid conduction and dissipation of any heat developed within the capacitors and transferred to the terminal members thru the foil terminals 12, 13 and their soldered connections with said collars. Any heat developed within the material of insulating tube 1 by the eddy currents associated with each capacitor unit during its operation will be rapidly conveyed from the surface of said tube as above pointed out, the free circulation of air permitted by the construction of the open-ended hollow support 1 facilitating this connection greatly. The combination of the inner open space 2 with the metal collars 3 and 4 registering therewith, permits a rapid and complete dissipation by conduction and connection successively, of any heat generated within the capacitors proper (foils and micas) by virtue of the good mechanical connection between the said collars and the foils of opposite polarity constituting the armatures of the capacitors, it being apparent that any heat generated within the capacitors has a highly conductive path to the outer air without being restrained in any manner whatsoever.

The improved facility for the removal of any internally generated heat assures a long life to the capacitor assembly and to the separate units thereof, because the tendency towards breakdown, which would normally be encountered in connection with the energy developed to a substantial extent by high frequency currents is substantially minimized by the arrangement of the parts permitting the rapid and complete withdrawal of heat as and when it is generated.

The more important advantage of the disclosed structure, however, is in its high efficiency in operation first above referred to, involving its function of reducing the losses in operation thereby in the first place reducing the quantity of heat generated, and thereby cooperating in preventing overheating, with the above heat-dissipating characteristic of the structure. Said high efficiency in operation is due to the reduction of the eddy current losses in the armature foils, and the principle advantage of such losses is not primarily in reducing the quantity of heat generated but of improving the efficiency of the entire apparatus using very high frequency currents, with which the capacitor hereof may be associated and connected, i. e., currents of the order of hundreds of thousands of cycles per second. This increased efficiency of operation is due to the illustrated construction of the individual units 7—10 and to the arrangement of units so constructed, in the assembly with and relation to the long insulating support 1, all in addition to the splitting up of the complete capacitor into plural units connected in parallel. That is, the reduction of eddy current losses is effected primarily both by such construction and arrangement of the parallel-connected sub-units 7—10, and by the separation and parallel-connection of such sub-units having such construction and arrangement between the terminals of the complete capacitor and relative to long support 1. As illustrated in the drawings, the several capacitor units 7—10 are oblong in the direction of the axis of long support 1 with the result that in connection with such long support of practicably small diameter relative to its length and without an excessive number of sub-unit capacitor stacks 7—10, with very desirably low cost for mica, with a practicable arrangement of the projecting foils 12 relative to terminal members 3, 4, and with such lateral spacing between adjacent sub units or parallel sections that the overlapping field-portion are of low intensity and therefore harmless, there is obtained a maximum armature area in each sub-unit stack which is most effective in reducing eddy-current losses otherwise interfering with efficiency of operation with currents of very high frequency thru the armatures from one end terminal to the other. Preferably the number of oblong foil-sheets in each sub-unit or sheet-stack is small altho if desired the capacity of the entire device can be increased by adding mica and foil sheets to the separate sections. As shown, the periferal spacing between the separate sections is substantial and sufficient so that the overlapping electrostatic fields of successive sections are of such low intensity as not to be troublesome in lowering the efficiency of operation of any of the apparatus which may be employed in the circuit. Each unit or section is shown as thin, flat and flexible, and each is bent directly against the outer surface of support 1 and all are held in such flexed condition in their separate locations by means of the securing means 11 extending around the outside of all the periferal series of sections,—the whole constituting a simple low-cost structure. The arrangement of the oblong sections lengthwise of the length of long support 1 not only possesses the most important advantage of reducing eddy-current losses in the several sections by providing maximum armature area in each sub-unit, but has a valuable function reducing cost of manufacture of the capacitor to include the far preferable dielectric of mica, —thus. As is well known in art, it is extremely difficult to obtain large quantities of good mica sheets having both superficial dimensions in excess of more than three inches, and the same are correspondingly expensive; but on the other hand good mica is relatively low in cost, having one dimension approximately as long as supporting tube 1 but the other dimension relatively small, as three inches or less. By the use of such relatively cheap but good mica sheets, and arranging them with their longer lengths along the axis of support 1, making the latter as long as desired and of substantially the same length as the longer dimension of the mica sheets, (the shorter dimension of the mica sheets lying successively around support 1 permitting the employment of a sufficient number of sub-units or thin flat sections hereinafter referred to), a sufficient area of dielectric is provided for a maximum active area of armatures on opposite sides of the mica dielectric, thereby accomplishing the object of reducing the eddy-current losses and using the optimum dielectric material, mica, at an extremely low relative cost. As shown in Fig. 1, the outer layer of dielectric material of each of sections 7—10, next securing means 11, consists of a sheet of greater thickness than the dielectric between foil-armatures, thereby reenforcing each section at its outer portion engaged by said periferal securing means. The above oblong structure and arrangement of sections relative to the length of support 1 corresponding to the longer direction of the micas, also is cooperative with terminal members 3 and 4 having portions at different points of their periferies which lie in line with the capacitor sections, such cooperation being due to the facts that the longer dimensions of the micas are such relative to the lengths of support 1 and members 3, 4 that projecting foils 12 lie alongside (and readily can be soldered to) the said periferal parts of metallic members 3 and 4 which lie longitudinally in line with the several capacitor sections, all the same contributing to the simplicity and low cost of the structure which consists essentially of only four elements, i. e., support 1, sections 7—10, terminals 3, 4 and securing means 11, combined in the practical structure described. As to the thin, flat sections 7—10, in the above oblong construction and arrangement between terminals 3, 4, experience has shown that, when the entire capacitor is divided into a plurality of sections so constructed individually and each so arranged relative to long support and terminals 3, 4, the field-intensity is lower per unit width of foils, and that causes the valuable reduction of losses set up by eddy currents in the foils.

It will now be seen that there has been provided an improved capacitor assembly which is particularly adapted for short wave work, wherein excessive quantities of heat might be generated and then must be taken care of, by substantial prevention or dissipation, preferably both as disclosed, and one which is characterized by a notable simplicity and low cost of construction and high efficiency in operation. While a preferred embodiment has been illustrated and described by way of example, it is to be understood that it is not intended to be limited to the one shown for since the underlying principles may be incorporated in other specific embodiments, it is intended to cover all variations and modifications of the structure shown and comprehended within the spirit and scope of this invention, except as any limitations thereto are imposed by the appended claims.

I claim:

1. An improved short-wave capacitor, including, in combination, an insulating hollow support, metal collars on each end of the support, a plurality of individual capacitor units periferally disposed on said support in good mechanical and electrical connection with said collars whereby they are associated in parallel, and means to retain the units under suitable compression against the surface of said support.

2. In a capacitor assembly, in combination, an insulating support having a central aperture, a plurality of capacitors facing and supported on the surface of said support, terminal members of opposite polarity on the ends of the support and adapted to connect the several capacitors in parallel, said capacitors being so constituted and arranged with respect to the support that the electrostatic fields set up inside and outside the support are effectually dissipated with minimum eddy-current losses.

3. An improved short-wave capacitor, including, in combination, an insulating support, metal connections on each end of the support, a plurality of individual capacitor units laterally spaced from one another on said support and in good mechanical and electrical contact with said metal connections whereby they are associated in parallel, and means common to all said units for retaining them under compression.

4. A capacitor for high frequency currents including a plurality of thin, flat sheet-stacks each having oblong sheet mica dielectric and correspondingly oblong foil-sheet armatures together constituting flexible capacitor sub-units; a hollow cylindrical tube of insulating material having a length approximately the same as the longer dimension of said oblong sub-units, the latter being flexed against the outer surface of said tube with the longer dimension of their mica dielectrics extending endwise of the tube, the sub-units lying in a transverse series extending periferally around the tube with their longer edges substantially spaced from one another, all reducing eddy current losses with high frequency currents; insulating means extending around such periferal series of sub-units holding the several units in their flexed condition supported against the outer supporting surface of the insulating tube; and metallic collars secured to the two ends of the tube as common terminals for all the sub-units constituting them as a unitary capacitor; the armature foils of each sub-unit projecting from the two shorter ends of the sub-units in positions lying beyond the ends of the sub-unit adjacent said metallic collars, and said projecting foils being held in good electrical and thermal relation with said terminal collars connecting the several sub-units in parallel with one another.

5. A capacitor for high frequency currents including a plurality of thin, flat sheet-stack sub-units each having oblong sheet mica dielectric and correspondingly oblong foil-sheet armatures; a hollow support of insulating material having a length not greatly in excess of the longer dimension of said oblong sub-units, the latter lying in separate positions against the outer surface of the support and in a transverse series extending periferally around said support, with the longer dimension of their mica dielectrics extending endwise the insulating support, and the longer edges of the sub-units substantially spaced from one another periferally of the support, all reducing eddy-current losses with high frequency currents; insulating means extending around said periferal series of sub-units holding the several units supported against the outer surface of the insulating support; and metallic terminals secured to the two ends of the insulating support as common terminals for all the sub-units constituting them as a unitary capacitor; the armature foils of each sub-unit projecting from the two shorter ends of the sub-unit in positions lying beyond the ends of the sub-unit and opposite said terminals, the latter having surfaces exposed to the faces of the projecting foils, and the latter being held in good electrical and thermal relations with said end terminal surfaces connecting the several sub-units in parallel with one another.

6. A capacitor for high frequency currents including a plurality of thin flat sheet-stacks of dielectric and foil-sheet armatures constituting capacitor sub-units; a hollow insulating support for said sub-units the latter lying in separate positions against the outer surface of the hollow support and in a transverse series extending periferally around the support, with their dielectrics extending longitudinally substantially to the ends of the support, and the longitudinal edges of the sub-units substantially spaced from one another periferally of the support, all reducing eddy-current losses with high frequency currents; the foils of the several sub-units projecting beyond the ends of the sub-unit and the dielectrics; and metallic terminals located at the two ends of said support in positions opposite the projecting foils of the several separated sub-units and in good electrical and thermal relation with said foils connecting the sub-units in parallel constituting a unitary capacitor.

7. A capacitor for high frequency currents including a plurality of thin, flat sub-units of dielectric and foil-sheet armatures, a hollow support of insulating material, the sub-units being mounted in separate positions against the outer surface of the hollow support in a periferal series, with their dielectrics extending longitudinally substantially to the ends of the support, and the longitudinal edges of the sub-units substantially spaced from one another periferally of the support, all reducing eddy-current losses with high frequency currents; the foils of the several sub-units projecting beyond the ends of the sub-units and the dielectrics; and metallic terminals at the ends of the support lying radially inward of said projecting foils, the latter in the several sub-units being in good electrical and thermal relation with successive periferal portions of said end terminals connecting the sub-units in parallel and constituting them as a unitary capacitor.

8. A capacitor for high frequency currents including a plurality of thin, flat sheet-stacks constituting sub-units and each having oblong sheet mica dielectric and correspondingly long foil-sheet armatures; and a hollow support of insulating material having a length substantially the same as the longer dimension of said oblong sub-units, the latter being mounted in separate positions against the outer surface of the hollow support in a transverse series around said support, with the longer dimension of their mica dielectrics extending substantially from end to end of the support, and the longer edges of the oblong sub-units substantially spaced from one another periferally of the support, all reducing eddy-current losses with high frequency currents; the foils projecting beyond the ends of the sub-units and mica dielectric; and means connecting the foils projecting beyond the respective ends of the insulating support to common terminals connecting the sub-units in parallel constituting a unitary capacitor.

9. A capacitor for high frequency currents including a hollow support of insulating material, a plurality of thin, flat sub-unit capacitors including foil-sheet armatures and supported in separate positions against the surface of said support, the dielectrics of said sub-units occupying substantially all the surface of said support from end to end thereof, and periferally thereof save for substantial spacing from one another successively, the dielectrics of the sub-units extending substantially from end to end of the hollow insulating support, all reducing eddy-current losses with high frequency currents; the foil-armatures projecting beyond the dielectrics of the several sub-units; and metallic terminals located beyond the two ends of the support, each being common to said foils of all the sub-units which project beyond the respective ends of the sub-unit, connecting the several units in parallel as elements of a unitary capacitor.

10. A capacitor which includes a thin-walled hollow support of insulating material, a plurality of foil-armature capacitor units periferally disposed and severally facing and supported in distributed arrangement on the outside surface of said hollow support; means securing said units to said support; and two metallic different-potential heat-dissipating terminal-collars also severally facing and supported in distributed arrangement on the outside surface of said support but in locations respectively between its ends and the capacitor units also secured to said outside surface, said collars being insulated from one another by the insulating support; the foil-armatures of different polarities extending from the capacitor units as terminal-leads and secured directly to said insulated collars in good electrical and thermal connection therewith whereby the collars connect the plural capacitor uints in parallel; the efficiency of operation of the capacitor as a whole being increased first by an arrangement of the capacitor units in spaced-apart relations on the insulating support thereby reducing heat losses by reducing the extent and intensity of over-lapping portions of the electrostatic fields, and the efficiency of operation being increased further by said slight thickness of the wall of the hollow support thereby providing small volume of insulating material located in the electrostatic fields; and even the small amount of heat generated being dissipated rapidly by the accessibility to heat-conveying media provided by said distribution of the capacitor units and terminal collars over the outside surface of the insulating support and also by the exposure to heat-conveying media, of the inside surface of the hollow support free of the capacitor units and collars.

11. A capacitor which includes a thin-walled hollow support of insulating material, a plurality of capacitor units periferally disposed and severally facing and supported in distributed arrangement on the outside surface of said hollow support; means securing said units to said support; and two metallic different-potential heat-dissipating terminal-collars also severally facing and supported in distributed arrangement on the outside surface of said support but in locations respectively between its ends and the capacitor units also secured to said outside surface, said collars being insulated from one another by the insulating support but connected in good electrical and thermal relation to different-potential armatures of the plural units thereby connecting the latter in parallel as a multi-unit capacitor; the efficiency of operation of the capacitor as a whole being increased first by an arrangement of the capacitor units in spaced-apart relations on the insulating support thereby reducing heat losses by reducing the extent and intensity of over-lapping portions of the electrostatic fields, and the efficiency of operation being increased further by said slight thickness of the wall of the hollow support thereby providing small volume of insulating material located in the electrostatic fields; and even the small amount of heat generated being dissipated rapidly by the accessibility to heat-conveying media provided by said distribution of the capacitor units and terminal collars over the outside surface of the insulating support and also by the exposure to heat-conveying media, of the inside surface of the hollow support free of the capacitor units and collars.

12. A capacitor which includes a hollow support of insulating material, a plurality of foil-armature capacitor units periferally disposed and severally facing and supported in spaced distributed arrangement on said hollow support; and two terminal collars of opposite polarity also severally facing and supported in distributed arrangement on said support but in locations respectively between its ends and the capacitor units secured to said support; the foil-armatures of different polarities projecting from different portions of the several capacitor units and soldered directly to different portions of the periferies of the respective collars of different polarity whereby the plural capacitor units are connected in parallel in the capacitor as a whole.

13. A capacitor which includes a plurality of foil-armature capacitor units, two terminal members of opposite polarity connecting said units in parallel, and an insulating support over the surface of which said members and units severally are distributed in positions exposed from one another but mounted on the insulating support as a common supporting means which insulates said members and capacitor units from one another, the capacitor units being in spaced relation in a row along the portion of the insulating support between its ends; the two terminal members being located respectively between the ends of the insulating support and the row of capacitor units; the foil-armatures in the several capacitor units being spaced apart along said portion of the insulating support between its ends and independently projecting from the several units in two sets of different polarity extending over the same portions of length of the insulating support as the terminal members and the so overlapping terminal members and projecting foils being in good heat-conducting relations with one another; said arrangements of capacitor units and terminal members constituting means reducing heat losses in operation and facilitating dissipation of heat generated.

In testimony whereof I hereunto affix my signature.

WILLIAM M. BAILEY.